Aug. 14, 1928.

P. FABER 1,680,775

REVERSIBLE BLOWER APPARATUS

Filed May 31, 1927

Witness:
J. Burkhardt

Inventor:
Paul Faber,
By Cromwell, ...
Attys.

Patented Aug. 14, 1928.

1,680,775

UNITED STATES PATENT OFFICE.

PAUL FABER, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

REVERSIBLE BLOWER APPARATUS.

Application filed May 31, 1927, Serial No. 195,266, and in Germany June 9, 1926.

This invention relates to rotary compressor or blower apparatus, and pertains particularly to apparatus wherein the prime mover is arranged for operation in both rotational directions.

The general object of the invention is the provision of a blower apparatus which may be operated to deliver a desired volume or pressure when operated in either rotational direction.

Another object is the provision of rotary blower apparatus particularly adapted to serve Diesel motors or the like as supercharging or scavenging blowers, with equal efficiency when operated in either direction of rotation.

Another object is the provision of rotary blower apparatus adapted to be operated directly by the shaft of a Diesel engine, and deliver the desired output, efficiently, irrespective of the direction of rotation of the shaft.

A particular object is the provision of an improved rotary blower construction adapted to afford entering air proper guidance to give it an initial rotary motion before it enters the impeller, in order to insure a smooth entry, irrespective of the direction of rotation of the impeller.

Another specific object is the provision of rotary blower apparatus adapted to afford air leaving the impeller a proper control to give efficient delivery and the desired pressure energy, irrespective of the direction of rotation of the impeller.

A further object is the provision of rotary blower apparatus particularly adapted for marine installations.

Other and further objects will be pointed out or indicated hereinafter or will appear to one skilled in the art upon an understanding of the invention or its employment in practice.

In the drawing forming a part of this specification, I illustrate in diagrammatic fashion one embodiment of the invention, but it is to be understood that this is presented for purpose of illustration only and is not to be accorded any interpretation having the effect of limiting the claims short of the true and most comprehensive scope of the invention in the art.

The use of blowers of the centrifugal type for the scavenging and supercharging of Diesel engines is attended with certain highly desirable advantages. This is particularly true in the case of marine Diesels, because of the small size and weight of centrifugal blowers in comparison with other types of compressors of equal capacity. Efficient centrifugal blowers of present design, however, are not adapted for use on direct drive from engines which have to be operated in different directions at different periods. The present invention provides a centrifugal blower which may be operated efficiently in either rotational direction.

Figure 1:
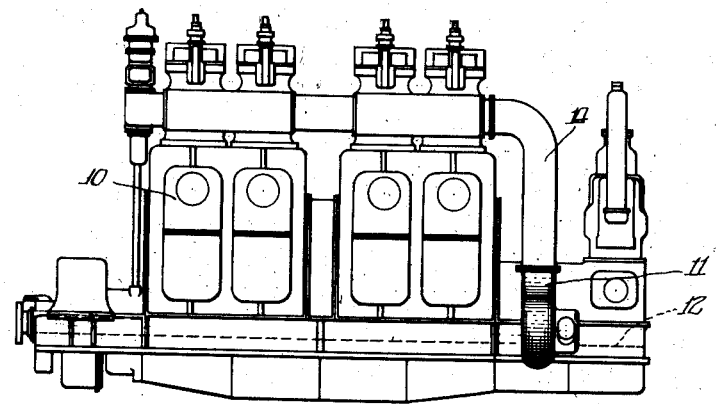
Fig. 1 is intended to illustrate a side elevation of an installation of apparatus comprising a Diesel engine of the marine type with a rotary blower of a type contemplated in the present invention.
Figure 2:
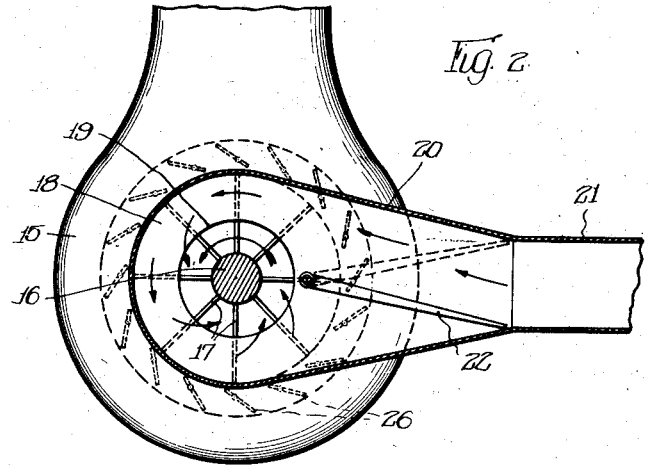
Fig. 2 is a transverse sectional view of a rotary blower embodying features of the invention, the section being taken through the inlet volute.

The nature of the invention will be ascertained from the illustrative embodiments in the drawing. In Fig. 1 the reference numeral 10 designates generally a Diesel engine which is served by a centrifugal blower 11, having direct driving connection with the motor shaft 12 and having delivery connection with the motor by a conduit 14. Since the blower must deliver to the engine, irrespective of the direction of rotation of the shaft, it contains special features of construction qualifying it to properly handle the compressed medium incident to operation of the engine in either direction. As illustrated in Fig. 2, the reference numeral 15 designates the delivery portion of the casing, 16 the impeller shaft, 17 the impeller blades, 18 one of the shroud discs of the impeller, and 19 the axial entry opening into the impeller. Covering the entry opening is the entry volute 20, which communicates laterally of the shaft with the intake 21. The impeller blades are of a simple radial type, suitable for centrifugal delivery of air with rotation of the impeller in either direction. In order that the air be given a desired rotational movement, so as to obtain smooth entry into the impeller, the entry volute is formed so that air may approach the entry opening from the intake in a tangential relationship to the former, and a damper or deflector 22 is provided in the entry volute, adjustable so as to deflect air from the intake to either side of the entry opening. Thus, when the impeller is to be operated in the direction indicated by the winged arrow in Fig. 2, the damper 22 will occupy the position shown in full lines, so that the entering air will approach the entry opening in a tangential relationship and in the direction of movement of the impeller blades. The entry volute is so proportioned as to give a requisite volume of intake air, and affords a proper space about the entry opening to permit the air assuming a rotational direction of movement in conformity with that of the impeller before it passes into the same. Thus, smooth entry is obtained with the resulting advantages in efficiency. When the impeller is rotated in the direction counter to that indicated by the winged arrow in Fig. 2, the damper 22 will be placed in the position illustrated in dotted lines in that figure, so that the same result is obtained.

Figure 3:
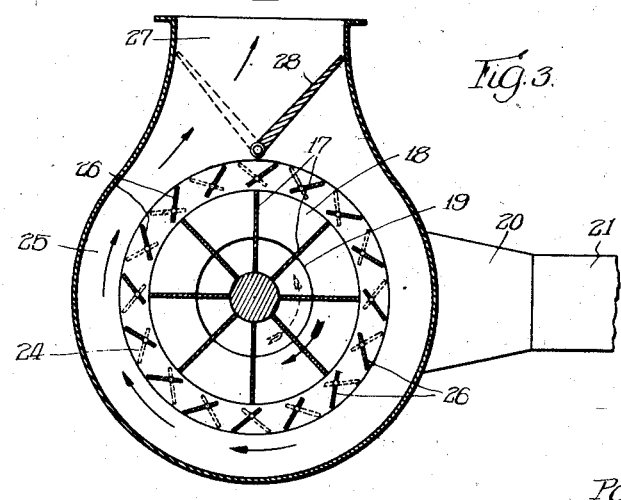
Fig. 3 is another transverse section of a blower taken through the impeller, the delivery vanes and the delivery volute.

On the delivery side, the blower is designed to give like results with either direction of operation of the impeller. The simplest arrangement is a diffuser without vanes, that is to say, one arranged with two flat annular plates, corresponding to the plates designated 24 in Fig. 3, which form fixed guides in the planes of the impeller shrouds, between the impeller and the delivery volute 25. A considerable part of the kinetic energy contained in the air delivered from the impeller will be transformed into pressure energy between these two guides. However, a better result is obtained with the use of diffuser vanes between the diffuser guides. Such vanes are illustrated at 26. They are straight and are adjustably mounted so that their direction may be reversed. Thus, for the operation of the impeller in the direction indicated by the winged arrow in Fig. 3, the vanes will be placed in the positions illustrated in full lines, and for rotation of the impeller in the opposite direction, they will be placed in the positions illustrated in dotted lines. Thus, in addition to augmenting the pressure energy of the air, they give the air leaving the impeller a suitable direction for smooth departure. The delivery volute, which extends completely around the impeller and the diffuser, merges into the delivery throat 27 with a gradually increasing cross section. In this throat is mounted a delivery directing damper 28, which is positioned in accordance with the direction of rotation of the impeller, to close the volute at one side of the throat and affording at the other side an outlet passage of progressively increasing size. The delivery throat is connected with the conduit 14 whereby the output of the blower is delivered to the desired point. For operation of the impeller in the direction indicated by the winged arrow in Fig. 3, the damper 28 is placed in the full line position, and for operation of the impeller in the opposite direction, it is placed in the dotted line position. It will be observed that by virtue of the arrangement of the intake on a radial line of the impeller, instead of on an eccentric line, a single intake will serve the blower for operation in either direction, and that by virtue of a similar radial disposal of the outlet throat, only a single delivery connection is required. Any suitable mechanism may be employed for the positioning of the dampers and the diffuser vanes, and same may be made responsive to reversal of the engine, so that the blower is automatically placed in the adjustment appropriate to the rotation of the engine shaft. The dampers may be operated by simple link and lever connections, and the diffuser vanes by types of adjusting mechanism now employed for adjusting the diffusers in centrifugal compressors designed for a single direction of rotation. The adjusting means for the diffuser blades may also be such as to permit their adjustment to various positions between the two extreme positions indicated in Fig. 3, thus to adapt the blower to different speeds of operation.

What I claim is:

1. Blower apparatus comprising the combination with a reversible prime mover, of a reversible rotary blower, and means for varying the entry direction of air to the blower.

2. Blower apparatus comprising the combination with a reversible prime mover, of a reversible centrifugal blower, and means for varying the entry direction of air to the blower.

3. Blower apparatus comprising the combination with a reversible prime mover, of a reversible blower having a centrifugally acting impeller, and adjustable means for varying the direction of air entry to the impeller.

4. Blower apparatus comprising the combination with a reversible prime mover, of a centrifugal blower having a reversible impeller, and means for admitting air to the impeller at different sides of the impeller axis.

5. Blower apparatus comprising the combination with a reversible prime mover, of a centrifugal impeller operable in either of opposite rotational directions and adjustable means for directing both entering air and leaving air in alternative directions relative to the impeller.

6. Blower apparatus comprising, in combination, a reversible Diesel engine and a reversible centrifugal blower driven by said engine and supplying air thereto.

7. Blower apparatus comprising, in combination, air impeller operable in either rotational direction to deliver air centrifugally, an entry volute for the impeller, and means for directing air into the volute in alternative tangential directions.

8. Blower apparatus comprising, in combination, an impeller operable in either rotational direction to deliver air centrifugally, an inlet compartment enclosing the entry opening of said impeller, and adjustable means for directing entering air to alternative sides of the entry opening.

9. Blower apparatus comprising, in combination, an impeller operable in either rotational direction to deliver air centrifugally, said impeller having an axial entry opening, an inlet housing covering the inlet opening, and adjustable means for controlling the direction of entering air in said housing.

10. Blower apparatus comprising, in combination, an impeller operable in either rotational direction to deliver air centrifugally, guide vanes for deflecting air delivered from the impeller, said guide vanes being adjustable to direct the delivered air to either side of a line radial to the impeller axis.

In testimony whereof I have hereunto subscribed my name this 4th day of May, A. D. 1927, at Zurich, Switzerland.

PAUL FABER.